US010151830B2

(12) United States Patent
Cook et al.

(10) Patent No.: US 10,151,830 B2
(45) Date of Patent: Dec. 11, 2018

(54) SYSTEMS AND METHODS FOR DETECTING OBJECTS PROXIMATE TO A MACHINE UTILIZING A LEARNED PROCESS (71) Applicant: Caterpillar Inc., Peoria, IL (US)

(72) Inventors: Jarrod Cook, Washington, IL (US); Jacob Maley, Germantown Hills, IL (US)

(73) Assignee: Caterpillar Inc., Deerfield, IL (US)

( * ) Notice: Subject to any disclaimer, the term of this patent is extended or adjusted under 35 U.S.C. 154(b) by 290 days.

(21) Appl. No.: 15/265,499

(22) Filed: Sep. 14, 2016

(65) Prior Publication Data
US 2018/0074178 A1 Mar. 15, 2018

(51) Int. Cl.
G01S 13/04 (2006.01)
G01S 13/88 (2006.01)
G01S 7/06 (2006.01)
G08B 21/18 (2006.01)
G08B 29/18 (2006.01)
G01S 13/00 (2006.01)

(52) U.S. Cl.
CPC .............. G01S 13/04 (2013.01); G01S 7/06 (2013.01); G01S 13/88 (2013.01); G08B 21/182 (2013.01); G08B 29/186 (2013.01)

(58) Field of Classification Search
None
See application file for complete search history.

(56) References Cited

U.S. PATENT DOCUMENTS

| 4,600,356 A | * | 7/1986 | Bridges | E02F 9/245 172/6 |
| 4,677,555 A | * | 6/1987 | Goyet | E02F 9/2045 356/3.09 |
| 5,198,800 A | * | 3/1993 | Tozawa | E02F 9/24 212/276 |
| 5,404,661 A | * | 4/1995 | Sahm | E02F 3/427 37/347 |
| 5,438,771 A | * | 8/1995 | Sahm | E02F 9/2045 172/7 |
| 5,553,407 A | * | 9/1996 | Stump | G01V 3/12 37/348 |
| 5,668,739 A | | 9/1997 | League et al. | |
| 6,052,079 A | | 4/2000 | Kitahara et al. | |
| 6,055,042 A | | 4/2000 | Sarangapani | |

(Continued)

Primary Examiner — Bernarr E Gregory
(74) Attorney, Agent, or Firm — Miller, Matthias & Hull (57) ABSTRACT A system for detecting objects in a zone proximate to a machine includes a detection sensor, an output device, and a controller. The controller is configured to define an obstruction zone proximate to the machine and within the zone, receive detection signals from the detection sensor, determine if the detection signals indicate that an object exists within the obstruction zone, and determine if the object is indicative of a machine component, if the detection signals indicate that the object exists within the obstruction zone, based on a learned obstruction detection process. The learned obstruction detection process is configured to determine if the object is indicative of a machine component by comparing the detection signals with component-associated detection data. The controller is configured to provide an alert signal to the output device if the first object is not indicative a machine component.

20 Claims, 6 Drawing Sheets (56) References Cited

U.S. PATENT DOCUMENTS

| | | | | |
|---|---|---|---|---|
| 6,076,030 | A * | 6/2000 | Rowe | E02F 9/2045 |
| | | | | 172/4.5 |
| 6,201,493 | B1 | 3/2001 | Silverman | |
| 6,223,110 | B1 * | 4/2001 | Rowe | E02F 9/2045 |
| | | | | 111/177 |
| 6,282,477 | B1 * | 8/2001 | Gudat | E02F 9/245 |
| | | | | 37/348 |
| 6,363,632 | B1 * | 4/2002 | Stentz | E02F 9/24 |
| | | | | 37/348 |
| 8,195,342 | B2 | 6/2012 | Anderson | |
| 8,478,493 | B2 * | 7/2013 | Anderson | G05D 1/024 |
| | | | | 37/348 |
| 8,781,669 | B1 * | 7/2014 | Teller | G05D 1/021 |
| | | | | 700/245 |
| 9,052,394 | B2 * | 6/2015 | Allouche | E02F 9/245 |
| 9,260,059 | B2 | 2/2016 | Rayes et al. | |
| 9,489,635 | B1 * | 11/2016 | Zhu | G06K 9/033 |
| 2002/0063652 | A1 * | 5/2002 | Price | E02F 9/245 |
| | | | | 342/22 |
| 2004/0217851 | A1 | 11/2004 | Reinhart | |
| 2007/0260378 | A1 * | 11/2007 | Clodfelter | F41H 11/12 |
| | | | | 701/48 |
| 2009/0259399 | A1 | 10/2009 | Kotejoshyer et al. | |
| 2014/0297172 | A1 | 10/2014 | Huelsen | |
| 2016/0139262 | A1 | 5/2016 | Staynov | |

* cited by examiner

SYSTEMS AND METHODS FOR DETECTING OBJECTS PROXIMATE TO A MACHINE UTILIZING A LEARNED PROCESS

TECHNICAL FIELD

The present disclosure generally relates to object detection systems associated with machines and, more particularly, to object detection systems for machines that filter out detection of known objects having a known presence, proximate to the machine.

BACKGROUND

In a variety of work industries (e.g., construction, material movement, mining, hauling, and the like), objects in a vicinity or within a path of machines on a worksite may disrupt working operations of the machines. Further, such objects may cause damage to the machine, or other machines operating on the worksite, if the objects come in contact with the machine. Additionally, said objects may disrupt a prior planned path of movement for the machine, whether the machine is being operated in a manual, autonomous, or semi-autonomous mode.

Accordingly, object detection is often used to ensure that existence of objects lying in the vicinity of a machine on a worksite, in which the machine operates, is known to one or more onboard or remote operators of the machine. Object detection systems and methods may utilize a variety of sensors, positioned proximate to the machine, to determine existence of objects, for a given space, within the vicinity of the machine. For example, visual sensors, such as a camera, may provide a feed of a certain view, relative to the machine, in which an operator may determine existence of foreign objects.

In some scenarios, a visual sensor is not practical and/or an operator cannot pay attention to such a visual feed during the course of working operations. Accordingly, other sensing techniques and/or devices are utilized to determine object presence, such as detection sensors, RADAR (Radio Detection and Ranging) sensors, LiDAR (Light Detection and Ranging) sensors, and the like. By utilizing, for example, a radar sensor, an object detection system may scan a given space proximate to the machine and provide an alert to the operator, if data from the radar sensor indicates presence of an object within the given space.

However, raw data from, for example, a radar sensor does not inherently delineate whether an object detected within the given space is an object attached to, or otherwise associated with, the machine itself (e.g., ground engaging devices, machine frame elements, machine implements, and any objects purposefully attached to the machine) or if said object is a foreign object (a foreign object being any object not attached to, or otherwise not functionally associated with, the machine at a time in which object detection occurs). In such situations, object detection systems may provide an operator with false positive foreign object indications, because the data does not inherently indicate that such an object is not foreign, but rather a known, machine-associated component.

Therefore, object detection systems may filter out data indicative of certain objects that may cause false-positive detections, if not filtered. For example, an object detection system described in U.S. Pat. No. 9,260,059 ("False Warning Reduction Using Location Data") utilizes positioning data in conjunction with a database of target objects, associated with various locations, to filter out false-positive object indications, during operation.

However, even if filtering, based on a false warning database such as that of the '059 patent, is utilized, the filter data may not be sufficient for filtering out all objects associated with the machine. Especially in the context of work machines, the non-foreign objects associated with the machine may frequently change and rarely do two machine configurations include identical machine components, wherein such components may fall in the purview of object detection sensors. Further, such machine-associated objects, such as machine implements (e.g., blades, rippers, buckets, etc.) and machine structures (e.g., beds, tanks, tires, etc.), may be moved into a variety of positions within the detection area and not all positions of such implements may be filterable based on information from a general false detection database. Therefore, improved object detection systems and methods, in which false warning conditions may be customizable to an operator's specific machine configuration (e.g., the configuration including, but not limited to including, one or more of implements used in conjunction with the machine, positions of said implements, components attached to a frame of the machine, and the like), are desired.

SUMMARY

In accordance with one aspect of the disclosure, a system for detecting objects in a zone proximate to a machine is disclosed. The system may include a detection sensor operatively associated with the machine, an output device, and a controller operatively associated with the detection and output device. The detection sensor may be configured to generate detection signals, if the detection sensor senses an object within the zone, and transmit the detection signals. The output device may be configured to provide an alert to an operator of the machine, if an object is present in the zone proximate to the machine, in response to an alert signal. The controller may include a processor and a memory. The controller may be configured to define an obstruction zone proximate to the machine and within the zone, receive the detection signals from the detection sensor, determine if the detection signals indicate that an object exists within the obstruction zone, and determine if the object is indicative of a machine component of the one or more machine components, if the detection signals indicate that the object exists within the obstruction zone, based on a learned obstruction detection process. The learned obstruction detection process may be configured to determine if the object is indicative of the machine component by comparing the detection signals with component-associated detection data, the component-associated detection data indicative of occurrences in which one or more of the one or more machine components are detected within the obstruction zone. The controller may further be configured to provide the alert signal to the output device if the object is not indicative of the machine component of the one or more machine components.

In accordance with another aspect of the disclosure, a method for determining a learned obstruction detection process for an object detection system is disclosed. The learned object detection process may be associated with one or more machine components of a machine and may be configured for use within a zone proximate to the machine. The method may include receiving object detection signals over a period of time from a detection sensor operatively associated with the machine, each of the object detection signals associated with at least one of the one or more components of the machine. Detectable objects within the zone, during the period of time, may only include the one or more machine components. The zone may include an obstruction zone in which the one or more machine components lie. The method may further include classifying the received detection signals, over the period of time, as component-associated detection signals, and determining component-associated detection data based on the component-associated detection signals. The component-associated detection data may be indicative of occurrences in which one or more of the one or more machine components exist within the obstruction zone and configured for use in object detection, wherein such object detection compares the component-associated detection data with incoming detection signals, during an operation of the machine, to determine if an object identified by the incoming detection signals is indicative of one of the one or more components.

In accordance with yet another aspect of the disclosure, a machine is disclosed. The machine may include a machine frame, one or more machine components attached to the frame, one or more ground engaging devices, an implement, a detection sensor, an output device, and a controller operatively associated with the detection and output device. The detection sensor may be configured to generate detection signals, if the detection sensor senses an object within the zone, and transmit the detection signals. The output device may be configured to provide an alert to an operator of the machine, if an object is present in the zone proximate to the machine, in response to an alert signal. The controller may include a processor and a memory. The controller may be configured to define an obstruction zone proximate to the machine and within the zone, receive the detection signals from the detection sensor, determine if the detection signals indicate that an object exists within the obstruction zone, and determine if the object is indicative of a machine component of the one or more machine components, if the detection signals indicate that the object exists within the obstruction zone, based on a learned obstruction detection process. The component may be one of the one or more ground engaging devices, the one or more machine components, the implement, and any combinations thereof. The learned obstruction detection process may be configured to determine if the object is indicative of the machine component by comparing the detection signals with component-associated detection data, the component-associated detection data being indicative of occurrences in which one or more of the one or more machine components are detected within the obstruction zone. The controller may further be configured to provide the alert signal to the output device if the object is not indicative of the machine component.

These and other aspects and features of the present disclosure will be further described below in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which may not be necessary for an understanding of the disclosed subject matter have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
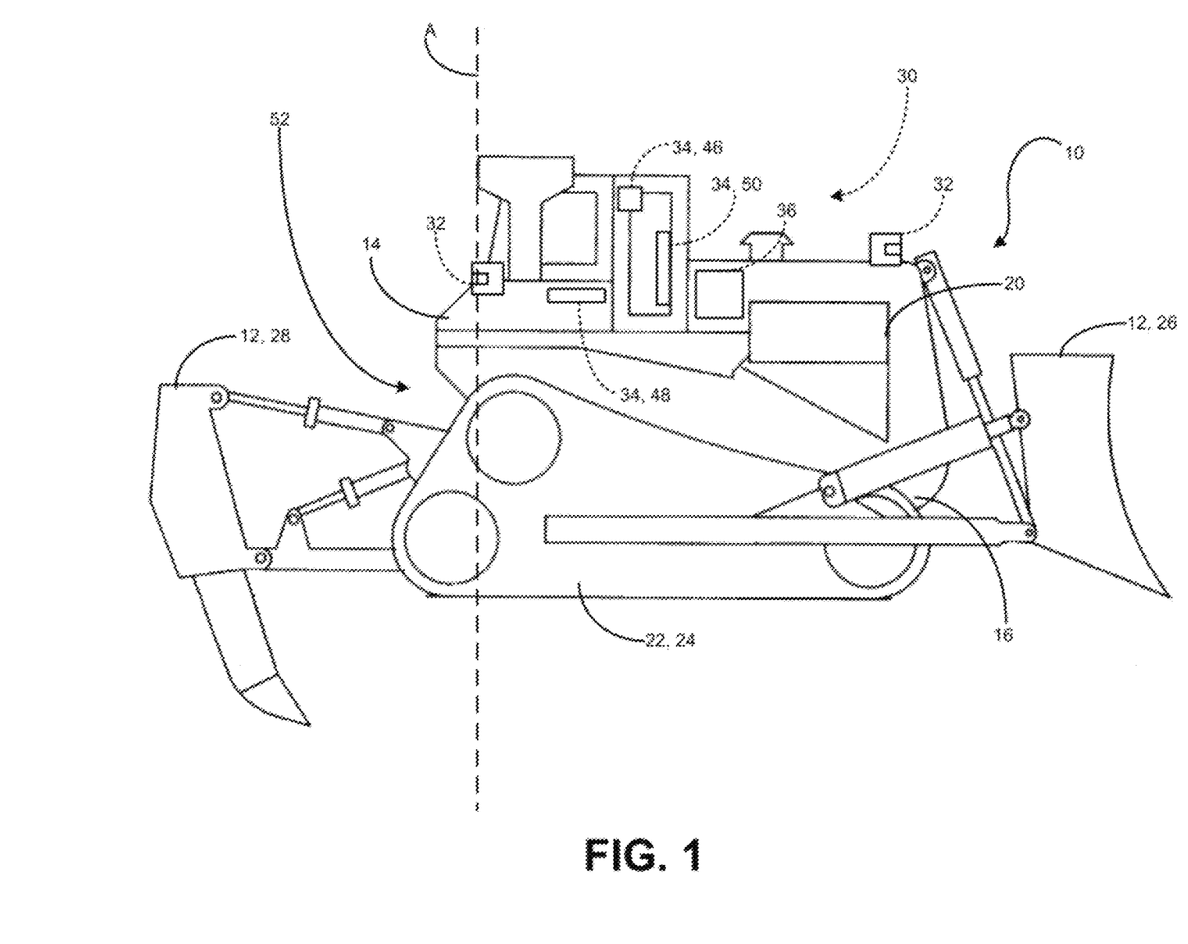
FIG. 1 is a side view of an example machine and elements of an example system for detecting objects in a zone proximate to a machine, in accordance with an embodiment of the present disclosure.

Turning now to the drawings and with specific reference to FIG. 1, a machine 10, utilizing one or more implements 12, is illustrated in accordance with the teachings of the present disclosure. While the machine 10 in FIG. 1 is depicted, generally, as a bulldozer-type machine, the teachings of the present disclosure may relate to other work machines. The term "machine" as used herein may refer to any machine that performs some type of operation associated with an industry such as construction, mining, farming, locomotive and/or rail industries, transportation, or any other industry known in the art. For example, the machine 10 may be a construction machine, such as a bulldozer, wheel loader, excavator, dump truck, backhoe, motor grader, material handler, tele-handler, or the like. Moreover, the one or more implements 12 connected to the machine may be utilized for a variety of tasks including, but not limited to breaking, ripping, hauling, construction, loading, compacting, lifting, brushing, among other things, and may include, for example, buckets, rippers, extruders, compactors, forked lifting devices, brushes, grapplers, cutters, shears, blades, breakers, hammers, augers, and the like. The machine 10 and implements 12 operate, in conjunction, to perform tasks on a worksite.

The machine 10 may include a frame 14, which may include or otherwise be connected to an undercarriage 16. To provide power for propelling or otherwise moving the machine 10, the machine 10 may include a prime mover 20, which may be, but is not limited to being, one or more of an engine, a battery, one or more fuel cells, and any combinations thereof. The prime mover 20 may be drivingly connected to one or more ground engaging devices 22, which harness the power of the prime mover 20 to move the machine 10. As shown, the ground engaging devices 22 are embodied by a continuous track 24 associated with the undercarriage 16; however, the ground engaging devices 22 are not limited to being continuous tracks and may additionally or alternatively include other ground engaging devices such as, but not limited to, rotatable wheels.

As discussed above, the machine 10 may include, or be otherwise associated with, one or more implements 12. In the example depiction of the machine 10, the machine 10 includes or is associated with two implements 12, a blade 26 and a ripper 28. The blade 26, in some examples, may be used to move or break up materials on a work site. The ripper 28 may be used to engage materials on a work site to, for example, loosen densely compacted materials. Both the blade 26 and the ripper 28 may be controlled and/or powered by the machine 10 and/or any control systems (not shown) of, or associated with, the machine 10.

For detecting objects and/or elements in proximity to the machine 10, the machine 10 may include, or be otherwise associated with, a system 30 for detecting objects proximate to the machine 10. The system 30 may include, at least, one or more detection sensors 32, one or more output devices 34, and a controller 36. Some elements of the system 30 are depicted in FIG. 1 and are denoted by dotted lines on said elements' markings. Additionally, the system 30 is depicted schematically in the schematic block diagram of the system 30, illustrated by FIG. 2.

Figure 2:
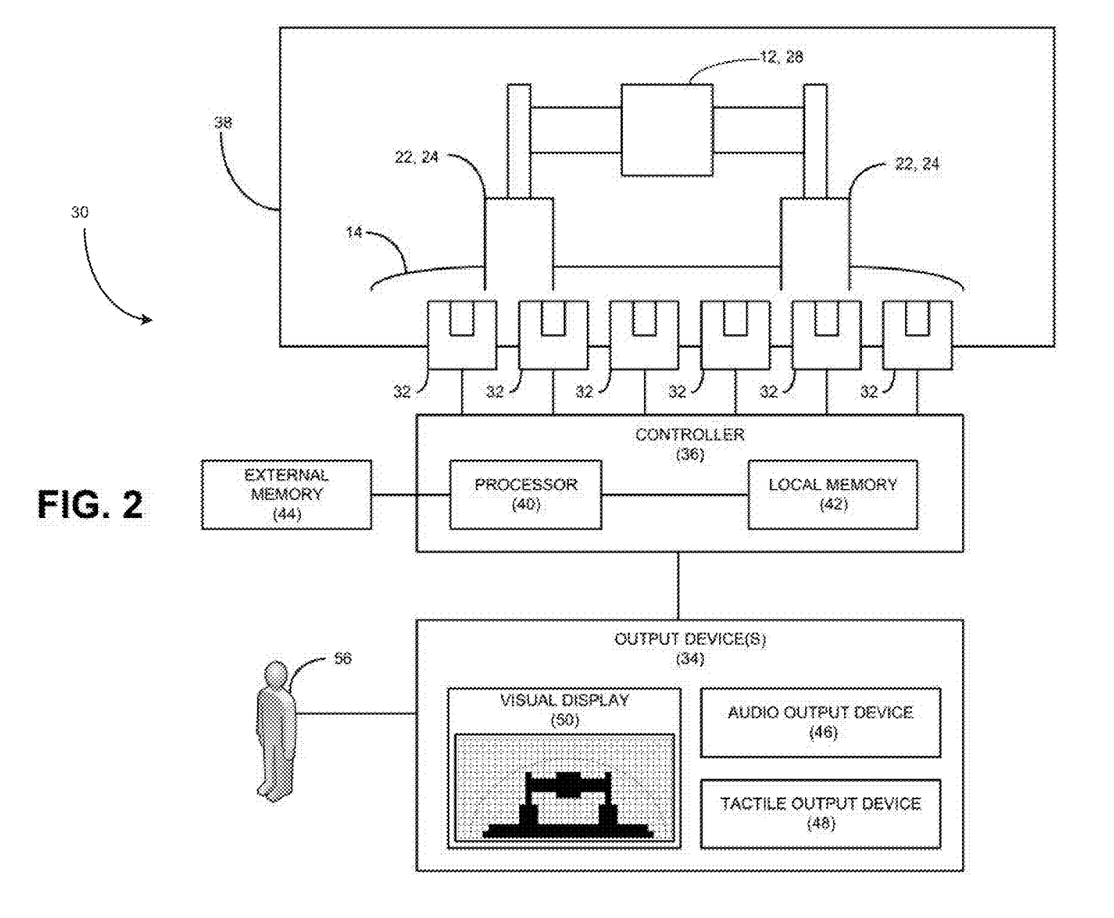
FIG. 2 is a schematic block diagram of the example system for detecting objects in a zone proximate to a machine, in accordance with an embodiment of the disclosure and FIG. 1.

The detection sensor(s) 32 may be operatively associated with the machine 10, by, for example, mounting or otherwise attaching the object detection sensor(s) 32 to the machine 10. However, the detection sensor(s) 32 need not be attached to the machine 10 and may be positioned relative to the machine 10 in any fashion in which the detection sensor(s) 32, in operation, can detect objects in a zone 38 proximate to the machine 10. The detection sensor(s) 32 may be configured to generate detection signals, if the detection sensor(s) 32 sense an object within the zone 38. Further, the object detection sensor(s) 32 may then be configured to transmit the detection signals to, for example, the controller 36; however, the object detection sensor(s) 32 are certainly not limited to only transmitting the detection signals to the controller 36 and may additionally or alternatively transmit said signals to any additional or alternative controller, said additional or alternative controllers being included on the machine 10 and/or located remotely with respect to the machine 10. In some examples, the object detection sensor(s) 32 may include a controller that determines data associated with object detection.

In some examples, one or more of the detection sensor(s) 32 may be radar sensors configured to transmit radar signals within the zone 38 (as illustrated in FIG. 2), wherein the radar signals are configured to reflect off objects in the zone 38, such as, but not limited to, the frame 14, the continuous tracks 24, and the ripper 28. In such examples, the detection sensor(s) 32 may detect reflected radar signals, of the transmitted radar signals, upon reflection off the objects in the zone 38. Furthermore, in such examples, the detection sensor(s) 32 may then generate detection signals based on the reflected radar signals. While an example is described wherein one or more of the object detection sensor(s) is a radar sensor, other detection sensors are certainly applicable as the detection sensor(s) 32, such as, but not limited to, one or more LiDAR sensors.

The detection signals produced by the detection sensor(s) 32 may be received by the controller 36, which includes, at least, a processor 40. The controller 36 may be any electronic controller or computing system including a processor which operates to perform operations, execute algorithms, store data, retrieve data, gather data, and/or any other computing or monitoring task desired. The controller 36 may be a single controller or may include more than one controller disposed to interact with one or more of the detection sensor(s) 32 and the output device(s) 34. For example, the controller 36 may encompass multiple controllers, such as, but not limited to, additional controllers functionally associated with the detection sensor(s) 32.

To output information based on output signals provided by the controller 36, the output device(s) 34 may include one or more of a plurality of output device(s) 34 including, but not limited to, an audio output device 46, a vibratory output device 48, and a visual display 50. The audio output device 46 may be any audio device capable of providing an audible signal to an operator 56. For example, the audio output device may be a speaker. Such audible signals may be any audible noise of any amplitude, configured to alert the operator 56, in response to an alert signal from the controller 36. The visual display 50 may be a screen or any visual device which may be configured to provide the operator 56 with any form of visual stimuli or a visual feed, in response to signals from the controller 36. While the visual display 50 is depicted in FIG. 1 as being within the machine 10, the visual display 50 may be off board with respect to the machine 10 (e.g., at a remote operator station) or in any location suitable to being seen by the operator 56 or any other user. Further, the vibratory output device 48 may be any vibratory and/or haptic device configured to alert the operator 56 via one or more vibrations, in response to an alert signal from the controller 36.

Functionality of the controller 36 may be implemented in hardware and/or software and may rely on one or more data maps. To that end, the controller 36 may include internal memory 42 and/or the controller 36 may be otherwise connected to external memory 44, such as a database or server. The internal memory 42 and/or external memory 44 may include, but are not limited to including, one or more of read only memory (ROM), random access memory (RAM), a portable memory, and the like. Such memory media are examples of nontransitory memory media.

Figure 3:
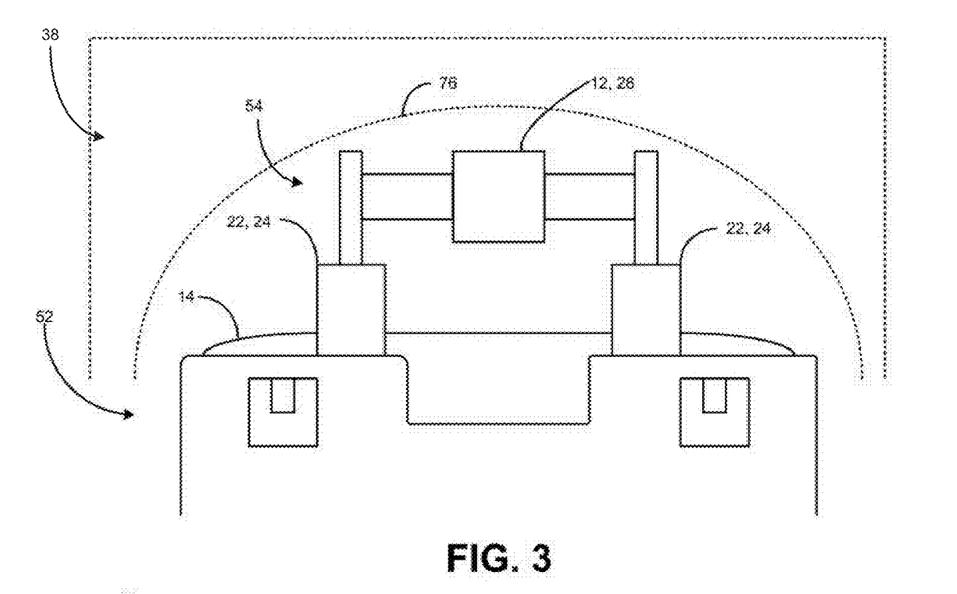
FIG. 3 is a top view of a rear portion of the machine of FIG. 1 and its associated components, illustrating the zone proximate to the machine, in which the system of FIGS. 1-2 may detect objects, and an obstruction zone within the zone, in accordance with FIGS. 1-2 and the present disclosure.

The controller 36 may be configured to execute instructions which, when executed, detect objects within the zone 38 proximate to the machine 10. The zone 38 may be any three-dimensional space proximate to the machine 10 in which the detection sensor(s) 32 are capable of detecting objects. To further illustrate the zone 38 and any objects, foreign or otherwise, located and detectable within the zone 38, a top view of a rear portion 52 of the machine 10, including elements lying in the zone 38, is illustrated in FIG. 3. The rear portion 52 is depicted in FIG. 1 as parts of the machine 10 to the left of the line A. While reference will be made to the zone 38 as illustrated proximate to the rear portion 52, the following systems and methods may be applicable with respect to any alternative zone 38 proximate to the machine 10 in which one or more detection sensors 32 can detect objects.

Within the zone 38, an obstruction zone 54 may be defined, by the controller 36, in which one or more components of the machine 10, in part or in whole, may lie (e.g., the frame 14, the ripper 28, the ground engaging devices 22). The obstruction zone 54 may be defined by manual input, by determination based on incoming data, by default zone parameters, and/or by any technique for designing the obstruction zone 54. Because the objects lying within the obstruction zone 54 are within the range of the detection sensors 32, the detection sensors 32, when operating, will detect such objects as objects within the zone 38. However, when desiring to utilize the detection sensor(s) 32 to detect foreign objects, such objects within the obstruction zone 54 can cause a false positive reading of a foreign object within the zone 38. As defined herein, a "foreign object" may refer to any object not attached to, or otherwise not functionally associated with, the machine at a time in which object detection occurs; accordingly, a foreign object may be any object not attached to the machine, including machine components that may have become disconnected from the machine or another machine. Accordingly, to improve functionality by lessening or eliminating false positive detection of machine-associated components, the system 30 may be configured, using the controller 36, to utilize a learned obstruction detection process so that the controller 36 effectively knows that the machine-associated components are not foreign objects, as described in more detail below. As defined herein, a "machine-associated component" may be any object that is part of, attached to, or otherwise operatively associated with the machine. For example, the frame 14, implements 12, and ground engaging devices 22, among other elements shown in FIGS. 1-3 and 5, are machine-associated components.

The controller 36 may determine if one or more of the detection signals, received from the detection sensor(s) 32, indicate that an object exists within the obstruction zone 54. Such objects may include, but are not limited to including, the frame 14, the ground engaging devices 22, and the ripper 28, as shown in FIG. 3. If detection signals indicated that the detected object exists within the obstruction zone 54, then the controller 36 may determine if the object detected is indicative of a machine component of the machine 10. "Machine component," as defined herein, refers to any object that is part of, attached to, or otherwise associated with the machine. For example, the frame 14, implements 12, and ground engaging devices 22, among other elements shown in FIGS. 1-3 and 5, are machine components.

To determine if the detected object is indicative of a machine component, the controller 36 may utilize a learned obstruction detection process. The learned obstruction detection process may be configured to determine if the detected object is indicative of a machine component by comparing the detection signals with component-associated detection data. Component-associated detection data may be data indicative of occurrences in which one or more machine components exist, or existed, within the obstruction zone 54. If the controller 36 determines that the detected object is a machine component, then the controller 36 will not provide an alert signal to the output device(s) 34; whereas, if the object in the obstruction zone 54 were determined to not be a machine component, the controller 36 would provide an alert signal to the output device(s) 34, which would then provide an alert to an operator 56 of the machine 10.

In some examples, the controller 36 may be configured to, at least in part, determine the learned obstruction detection process. As such, the controller 36 may be configured to, in some examples, determine the component-associated detection data and store the component-associated detection data on one or both of the internal memory 42 and the external memory 44. In some such examples, the controller 36 may be configured to receive detection signals from the detection sensor(s) 32 over a given period of time. During the given period of time, the only detectable objects within the obstruction zone 54 are machine components. One such example scenario, in which the only detectable objects are machine components, is illustrated in FIG. 3, wherein the only objects within the obstruction zone 54 are machine components (e.g., the ripper 28, the ground engaging devices 22, the frame 14). During the given period of time, the controller 36 may classify said detection signals received as component-associated detection signals, from which the component-associated detection data may be based upon. In some examples, the controller 36, in conjunction with the object detection sensor(s) 32 may collect detection signals within the obstruction zone 54 over the period of time and keep a count of the number of detections that occur. In such examples, if and when said number of detections occurred exceed a user-defined threshold, during the period of time, then the object is "learned out," and, thusly, said detection signals are classified as component-associated detection signals. As defined herein, "component-associated detection signals" may be any signal received from the detection sensor(s) 32 and/or derived from signals received from the detection sensor(s) 32 that are received or derived when a machine component is detected within a given range of the detection sensor(s) 32.

Figure 4:
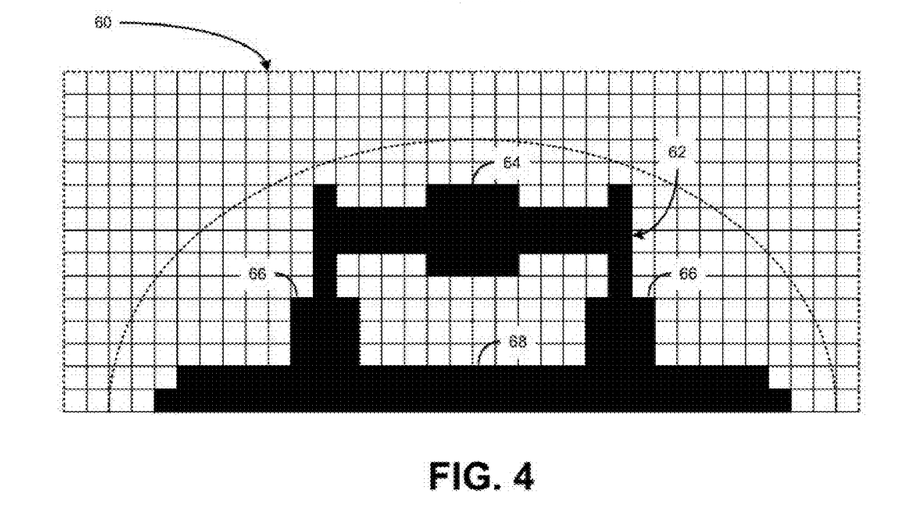
FIG. 4 is a virtual approximation of the zone and obstruction zone of FIG. 3, in a virtual top-view perspective, which may be displayed by an output device of the system of FIGS. 1-2, wherein the virtual approximation is populated with position-relative indications of one or more components of the machine lying within the obstruction zone, in accordance with FIGS. 1-3 and the present disclosure.

As shown in FIG. 4, in some examples wherein the output device(s) 34 are, or include, the visual display 50, the visual display 50 may be configured to display, in response to instructions from the controller 36, a virtual approximation 60 of the obstruction zone 54 and any machine components that, by way of the learned obstruction detection process, are present therein. A "virtual approximation," as defined herein, may refer to any virtual recreation or graphical representation, of any varying degree of accuracy and/or realism, of a space and/or zone and any objects present therein. For example, the virtual approximation 60 may be a virtual recreation, as shown recreated visually, of a space and/or zone proximate to the machine 10. The virtual approximation 60 of the obstruction zone 54 may also show a virtual approximation of space within the zone 38. As shown, the virtual approximation 60 of the obstruction zone 54 may be populated with position-relative indications 62 of the one or more machine components within the obstruction zone 54. The position-relative indications 62 are generated using, and are based on, the component-associated detection data. The position-relative indications 62 are "position relative," in that they are displayed on the visual display 50 in a virtual position relative to a virtual approximation of the obstruction zone 54, within the zone 38 and/or the obstruction zone 54, approximated by the controller 36.

FIG. 4 shows the position-relative indications 62, as depicted and juxtaposed with the illustration of the zone 38 in FIG. 3, and such position-relative indications 62 may include, but are not limited to including, virtual ripper indications 64, virtual ground engaging device indications 66, and virtual frame indications 68 which correlate, respectively, with the ripper 28, the ground engaging devices 22, and the frame 14 present in the zone 38. If one considers the depiction in FIG. 3 as, effectively, an image sample of the rear portion 52 at a sample time within the period of time, in which the learned obstruction detection process is determined, then the virtual approximation 60 of FIG. 4 represents a virtual approximation 60 of the obstruction zone 54 at that same sample time within the period of time. While the depiction of the virtual approximation 60, in FIG. 4, is represented as a grid in which position-relative indications 62 of the machine components are represented by black squares within the virtual space occupied by virtual machine components, any appropriate visual representation indicating a relative presence and/or positioning of the machine components, based on the component-associated detection data, may be displayed by the visual display 50.

Figure 5:
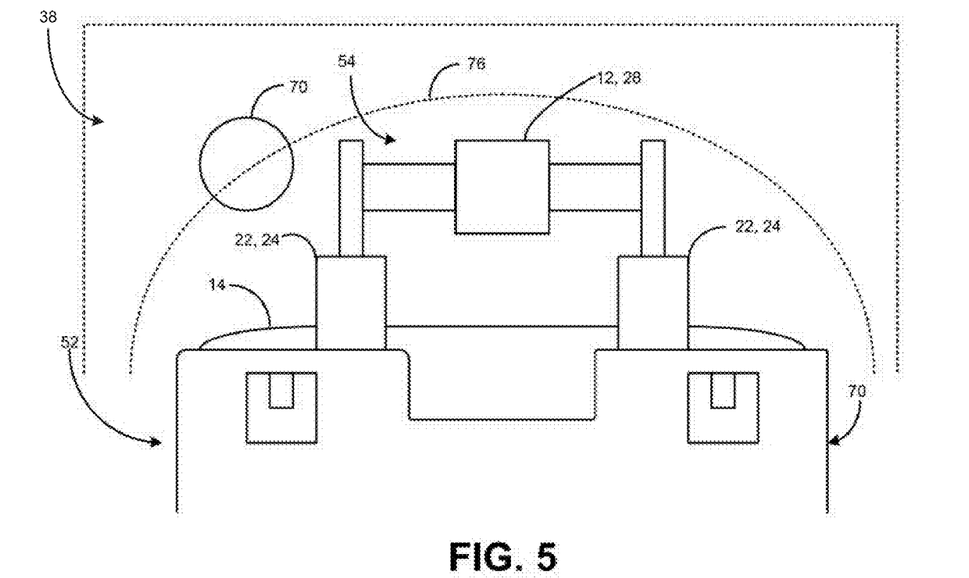
FIG. 5 is a top view of the rear portion of the machine of FIG. 1 and its associated components, illustrating the zone proximate to the machine, in which the system of FIGS. 1-2 may detect objects, and an obstruction zone within the zone, in a scenario in which a foreign object lies, at least in part, within the obstruction zone, in accordance with FIGS. 1-2 and the present disclosure.
Figure 6:
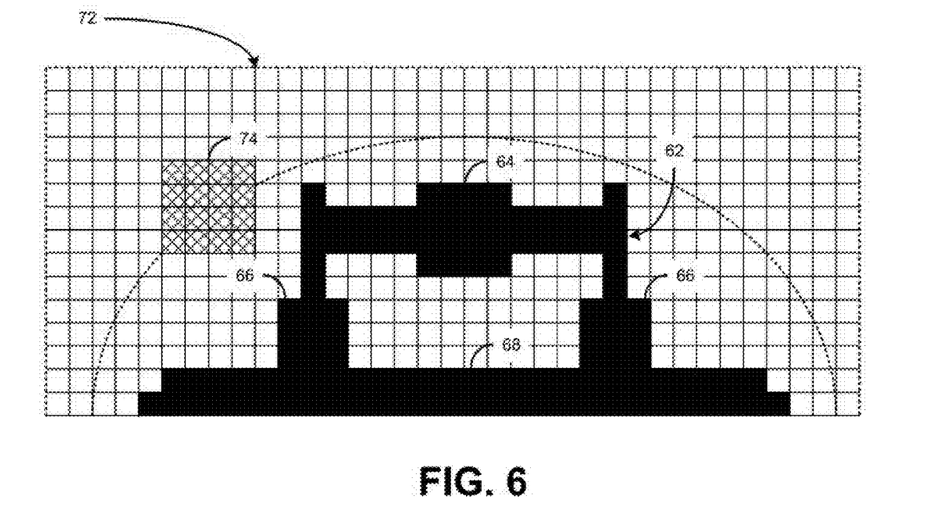
FIG. 6 is a virtual approximation of the zone and obstruction zone of FIG. 5, in a virtual top-view perspective, which may be displayed by the output device of the system of FIGS. 1-2, wherein the virtual approximation is populated with position-relative indications of one or more components of the machine lying within the obstruction zone, in accordance with FIGS. 1-3, 5 and the present disclosure.

Turning now to FIG. 5, the rear portion 52, the zone 38, and the obstruction zone 54 therein, are depicted at a moment when a foreign object 70 is, at least in part, present within the obstruction zone 54. FIG. 6 depicts a virtual approximation 72 of the obstruction zone 54, and adjacent portions of the zone 54. If one considers the depiction in FIG. 5 as a sample image at a point in time, said sample image is taken during machine operation wherein the system 30 is performing object detection. Accordingly, the depiction of FIG. 6 is a virtual approximation 72 taken at the same point in time and, at said point in time, the foreign object 70 is present, at least in part, within the obstruction zone 54. In such examples, position-relative indications 74 of the foreign object 70 may be displayed as part of the virtual approximation 72. While the depiction of the virtual approximation 72 is represented as a grid in which position-relative indications 62 of the machine components are represented by black squares within the virtual space occupied by virtual machine components and the position-relative indications 74 of the foreign object 70 are represented by cross hatched squares, any appropriate visual representation indicating a relative presence and/or positioning of the machine components (based on the component-associated detection data) and the relative presence and/or positioning of the foreign object 70 (based on received detection signals) may be displayed by the visual display 50.

In some examples, the controller 36 may be further configured to define the obstruction zone 54, within the zone 38, based on the component-associated detection data. For example, the controller 36 may configure boundaries and/or thresholds for the obstruction zone 54 based on positioning of machine components determined during determination of the learned obstruction detection process, said boundaries configured to further reduce false positive detections. Of course, in some other examples, the obstruction zone 54 may be defined by manual input, by determination based on additional data, by default, or by any technique for designing the obstruction zone 54.

In some examples, the controller 36 may be further configured to determine an obstruction threshold 76 for the obstruction zone 54, which may constrain the size of the obstruction zone 54 during both determination of the learned obstruction detection process and during system 30 operations for detecting objects. In some examples, the obstruction threshold 76 may be configured as having tolerances to account for mechanical fluxuations of machine components within the zone 38. For example, mechanical fluxuations may be any movement of a machine component in response to mechanical vibrations of the machine 10, vibrations of components themselves, and/or vibrations caused by environmental factors (e.g., weather, other machines, etc.). Such mechanical fluxuations may include or be caused by, but are not limited to one or more of component vibration, implement movement, and/or any machine component movement.

Therefore, when utilizing the obstruction threshold 76, which is configured as having such tolerances, if a component is slightly displaced during operation, a false positive detection will not be made by the controller 36, nor will object detection by the controller 36 be otherwise affected.

Further, in some examples, such as the examples of FIGS. 1, 3, and 5, wherein the machine 10 includes at least one implement 12 within the obstruction zone 54, such implement(s) 12 may be capable of being positioned in a plurality of implement positions. In such examples, the controller 36 may be further configured to, when determining the learned object detection process, determine the component-associated detection data for multiple implement positions. Accordingly, in such examples, the component-associated detection data may include data indicative of the implement(s) 12 being positioned in each of the plurality of implement positions, while lying in the obstruction zone 54.

In some examples of the system 30, the controller 36 may be configured to determine if a machine component (e.g., an implement 12) is detached from the machine 10, while comparing the received detection signals with the component-associated detection data. For example, if the machine 10 originally had an implement 12 attached and, accordingly, the implement 12 was present during configuration of the learned obstruction detection process, then if said implement 12 becomes detached from the machine 10, during object detection, the controller 36 may determine that the implement 12 is detached from the machine 10 by comparing received detection signals with the component-associated detection data. Because the controller 36 may recognize that there are no detection signals incoming, which would otherwise be filtered out, from the area of the component zone 54 in which the component-associated detection data indicates that the implement 12 lies, the controller 36 may determine that the implement 12 has been removed. Accordingly, in such examples, the controller 36 may be further configured to provide a warning or other indication to the operator 56, via, for example, the output device(s) 34, if the controller 36 determines that the implement 12 or any other machine component is detached from the machine 10.

INDUSTRIAL APPLICABILITY

In general, the foregoing disclosure finds utility in various industries, employing machines, in which systems and methods for object detection are employed. While the teachings of the present disclosure are presented as associated with the machine 10 depicted in FIGS. 1, 3, and 5, the teachings of the present disclosure may relate to any other work machines that perform some type of operation associated with an industry such as construction, mining, farming, transportation, or any other industry known in the art. For example, the teachings of the present disclosure may be applicable to, or employed in conjunction with, any construction machine, such as a bulldozer, wheel loader, excavator, dump truck, backhoe, motor grader, material handler, tele-handler, or the like.

By utilizing the systems and methods disclosed herein, greater accuracy in foreign object detection and a general decrease in false-positive detections, during object detection, may be achieved. Accordingly, utilizing the above-described learned obstruction detection process may improve functionality of object detection systems by lessening or eliminating false positive detection of machine-associated components. The systems and methods disclosed herein may allow for object detection to be utilized with machines that otherwise would not have been able to effectively utilize object detection in the past, because the false positives made by prior object detection systems made object detection undesirable for machines that include implements and other interfering machine structures. Effectively, utilizing such learned obstruction detection processes allow the system and/or overall detection method to know that machine-associated components are not foreign objects. Additionally, because the systems and methods disclosed herein provide processes for determining the learned object detection process, the learned object detection processes determined using such systems and methods are infinite and are infinitely customizable to any machine component combinations associated with a machine.

Figure 7:
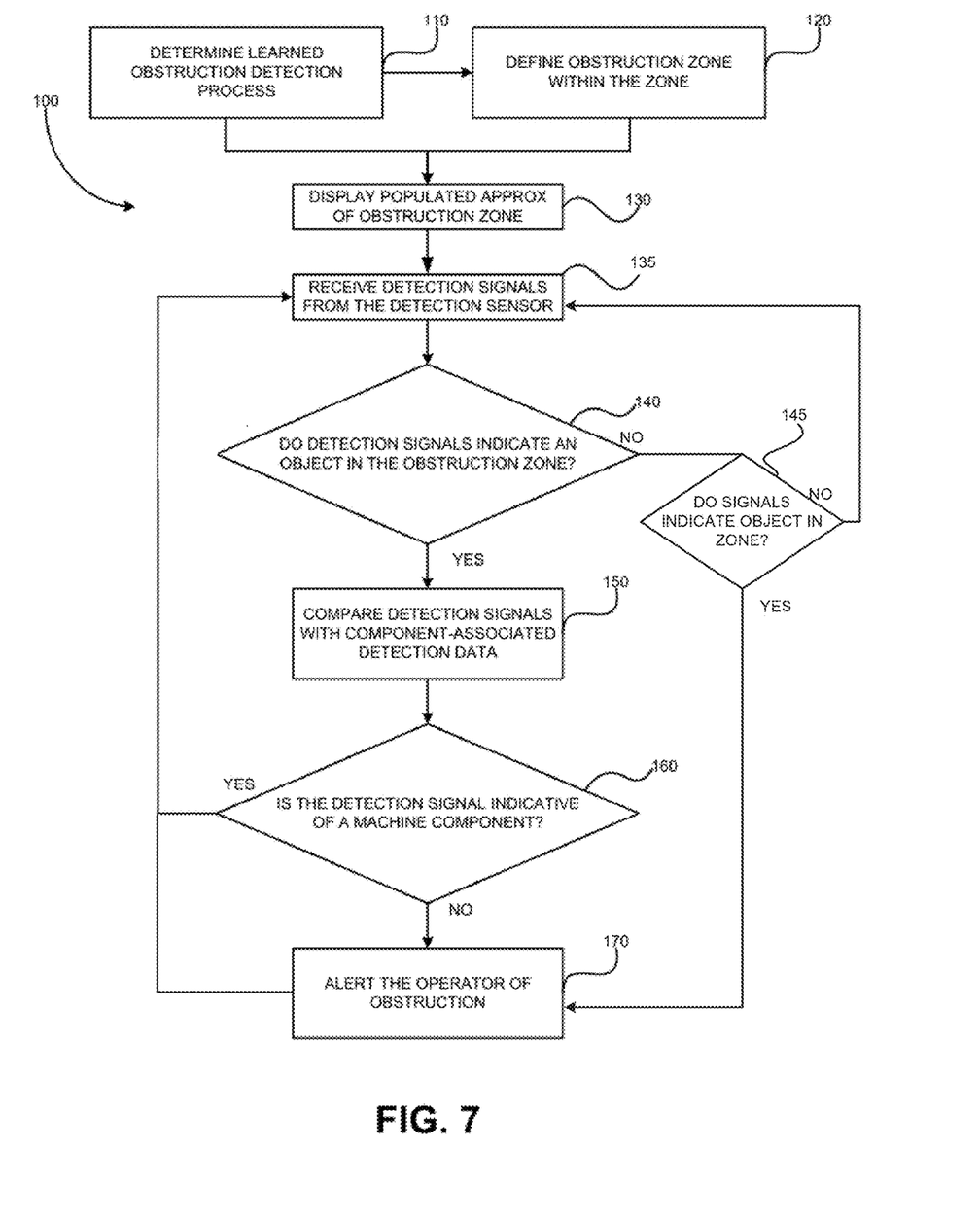
FIG. 7 is an example flowchart illustrating a method for detecting objects in a zone proximate to a machine, in accordance with an embodiment of the present disclosure.

To achieve these advantages, the system 30 for object detection may be utilized in addition to or in conjunction with a method 100 for detecting objects in the zone 38 proximate to the machine 10, which is depicted as a flowchart in FIG. 7. While the description of the method 100 presented below references elements of the system 30, the method 100 and any associated sub-methods may be executed using alternative elements and should not be construed as limited to execution via the system 30 and/or components thereof.

The method 100 may include determining the learned obstruction detection process, as depicted in block 110. In order to determine the learned obstruction detection process, a sub-method for block 110 may be performed, which is illustrated by blocks 111-119 in FIG. 8. The sub-method, of block 110, for determining the learned obstruction detection process may begin by receiving object detection signals from the object detection sensor(s) 32 over a period of time, during which the only detectable objects within the zone 38 are one or more machine components of the machine 10, as depicted in block 111.

Figure 8:
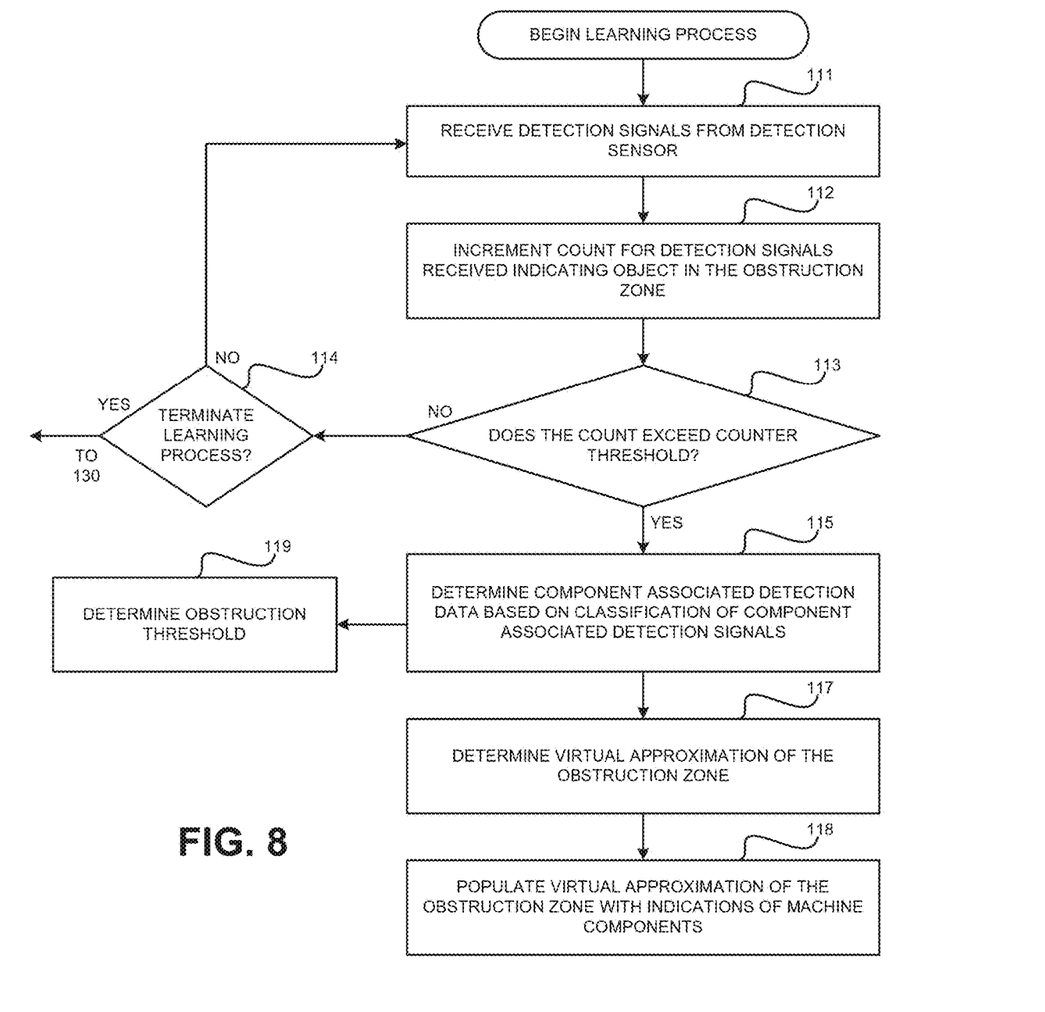
FIG. 8 is an example flowchart illustrating a method for determining a learned obstruction detection process for an object detection system or method, in accordance with an embodiment of the present disclosure and, optionally, in conjunction with the method of FIG. 7 and/or the system of FIGS. 1 and 2.

When the detection sensor(s) 32 generate a detection signal indicative of an object in the obstruction zone 54, a counter may be incremented, wherein each "count" of the counter is indicative of a sampled signal, each sampled signal indicating presence of a machine component within the obstruction zone 54, as depicted in block 112. The sub-method for block 110 may have a counter threshold for the counter, in which a certain number of counts, indicative of a machine component in the obstruction zone 54, must be received in the same location within the obstruction zone 54, for the obstruction to be considered component-associated detection data. Accordingly, the sub method for block 110 may evaluate if the current count exceeds the counter threshold, as depicted in block 113. If the count exceeds the counter threshold, then the sub-method for block 110 continues to block 115. However, as depicted at decision 114, if it does not exceed the counter threshold, then the sub-method for block 110 may terminate the learning process, which would return the data determined by the sub-method for block 110 to the method 100, otherwise the sub-method for block 110 may continue to receive detection signals from the detection sensor(s) 32, at block 111.

Once said detection signals are received, they may be classified as component-associated detection signals, as shown in block 115. The sub-method of block 110 may then determine the component-associated detection data based on the component-associated detection signals, wherein the component-associated detection data is indicative of occurrences in which one or more machine components exist within the obstruction zone 54, as further depicted in block 115. The component-associated detection data may be configured for use in, or in conjunction with, object detection systems and methods, such as the system 30 and/or the method 100. Accordingly, the component-associated detection data may be used in object detection systems and methods in which the systems and/or methods compare the component-associated detection data with incoming detection signals, during operations of the machine 10 on a worksite, to determine if an object indicated by the incoming detection signals is indicative of one or more machine components.

In some examples, the sub-method of block 110 may include determining an obstruction threshold 76 based on the component-associated detection data, the obstruction threshold 76 having tolerances to account for mechanical fluxuations of at least one machine component, as depicted in block 119. Further, in some additional or alternative examples, the sub-method of block 110 may determine a virtual approximation 60 of the obstruction zone 54, as depicted in block 117, and populate the virtual approximation 60 of the obstruction zone 54, with position-relative indications 62 of one or more machine components, lying within the obstruction zone 54, based on the component-associated detection data, as depicted in block 118.

Returning now to the method 100 of FIG. 7, the method 100 may include defining the obstruction zone 54, which, optionally, may be performed by utilizing the component-associated detection data, as depicted in block 120.

In some examples, prior to or during object detection, the method 100 may include displaying, using the visual display 50, the virtual approximation 60 of the obstruction zone 54, as depicted in block 130.

The method 100 may begin detecting objects on the worksite and within the zone 38, (the zone 38 may move with motion of the machine 10 on the worksite) at block 135, where the controller 36 begins receiving detection signals from the detection sensor(s) 32. From an analysis of the detection signals, the controller 36 may determine if the detection signals indicate that an object is in the obstruction zone 54, as depicted at the decision block 140. If the analysis of the detection signals indicates that an object is not in the obstruction zone 54, but exists within the zone 38, then the method 100 may proceed to block 170 and, optionally, it may also return to block 135, wherein the method 100 may continue to receive object detection signals, as shown by the decision 145.

If it is determined that an object exists in the obstruction zone 54, then the method may continue to block 150 wherein the detection signals are compared with the component-associated detection data, otherwise the method 100 may return to block 130 to continue monitoring detection signals from the detection sensor(s) 32. At the decision block 160, the method 100 may determine, based on the comparison of block 150, whether or not the detection signal(s) received are indicative of a machine component of the machine 10. If the detection signal(s) are indicative of a machine component, no action is taken and the method returns to block 130; however, if it is determined that the detection signal is not indicative of a machine component, then the operator 56 of the machine 10 is alerted using, for example, the output device(s) 34. In some examples wherein the output device(s) 34 includes a visual display 50, the alert may be embodied by showing position-relative indications 74 of the foreign object 70 as part of the virtual approximation 72.

It will be appreciated that the present disclosure provides systems and methods for object detection, which utilize a learned object detection process, and methods for determining such a learned object detection process. While only certain embodiments have been set forth, alternatives and modifications will be apparent from the above description to those skilled in the art. These and other alternatives are considered equivalents and within the spirit and scope of this disclosure and the appended claims.

What is claimed is:

1. A system for detecting objects in a zone proximate to a machine, the machine including one or more machine components lying within the zone, the system comprising:
a detection sensor operatively associated with the machine and configured to generate detection signals, if the detection sensor senses an object within the zone, and transmit the detection signals;
an output device configured to provide an alert to an operator of the machine, if an object is present in the zone proximate to the machine, in response to an alert signal; and
a controller operatively associated with the detection sensor and output device, the controller including a processor and a memory, the controller configured to:
define an obstruction zone proximate to the machine and within the zone,
receive the detection signals from the detection sensor,
determine if the detection signals indicate that an object exists within the obstruction zone,
determine if the object is indicative of a machine component of the one or more machine components, if the detection signals indicate that the object exists within the obstruction zone, based on a learned obstruction detection process, the learned obstruction detection process configured to determine if the object is indicative of the machine component by comparing the detection signals with component-associated detection data, the component-associated detection data indicative of occurrences in which one or more of the one or more machine components are detected within the obstruction zone, and
provide the alert signal to the output device if the object is not indicative of the machine component of the one or more machine components.

2. The system of claim 1, wherein the controller is further configured to:
determine the component-associated detection data, and
store the component-associated detection data on the memory.

3. The system of claim 2, wherein the controller is further configured to:
receive the detection signals from the detection sensor over a period of time, during which detectable objects, within the obstruction zone, only include the one or more machine components, and
classify the received detection signals over the period of time as component-associated detection signals, and
wherein, when determining the component-associated detection data, the controller is to determine the component-associated detection data based on the component-associated detection signals.

4. The system of claim 3, wherein the output device includes a visual display operatively associated with the controller, the visual display configured to display, in response to instructions from the controller, a virtual approximation of the obstruction zone in which space within the virtual approximation of the obstruction zone is populated with position-relative indications of the one or more machine components, lying within the obstruction zone, based on the component-associated detection data.

5. The system of claim 2, wherein the controller is further configured to determine if a machine component has become detached from the machine based on the comparison of the detection signals and the component-associated detection data.

6. The system of claim 2, wherein the controller is further configured to determine an obstruction threshold based on the component-associated detection data, the obstruction threshold having tolerances to account for mechanical fluxuations of at least one of the one or more machine components within the zone.

7. The system of claim 2, wherein, when defining the obstruction zone, the controller is to determine the obstruction zone based on at least one of the component-associated detection data, manual input, default zone parameters, or any combinations thereof.

8. The system of claim 1, wherein the detection sensor is a radar sensor configured to:
transmit radar signals within the zone, the radar signals being configured to reflect off the objects in the zone,
detect reflected radar signals of the transmitted radar signals, upon reflection off the objects in the zone, and
generate the detection signals based on the reflected radar signals.

9. The system of claim 1, wherein the one or more components of the machine includes an implement of a machine,
the implement capable of being positioned in a plurality of implement positions, and
wherein the component-associated detection data includes data indicative of the implement being positioned in each of the plurality of implement positions while lying in the obstruction zone.

10. A method for determining a learned obstruction detection process for an object detection system, the learned obstruction detection process associated with one or more machine components of a machine and configured for use within a zone proximate to the machine, the method comprising:
receiving object detection signals over a period of time from a detection sensor operatively associated with the machine,
detectable objects within the zone, during the period of time, only including the one or more machine components
the zone including an obstruction zone in which the one or more machine components lie,
each of the object detection signals associated with at least one of the one or more components of the machine;
classifying the received detection signals, over the period of time, as component-associated detection signals; and
determining component-associated detection data based on the component-associated detection signals, the component-associated detection data indicative of occurrences in which one or more of the one or more machine components exist within the obstruction zone, the component-associated detection data configured for use in object detection, wherein such object detection compares the component-associated detection data with incoming detection signals, during an operation of the machine, to determine if an object identified by the incoming detection signals is indicative of one of the one or more components.

11. The method of claim 10, further comprising determining an obstruction threshold based on the component-associated detection data, the obstruction threshold having tolerances to account for mechanical fluxuations of at least one of the one or more machine components within the zone.

12. The method of claim 10, further comprising populating a virtual approximation of the obstruction zone with position-relative indications of the one or more machine components, lying within the obstruction zone, based on the component-associated detection data.

13. The method of claim 12, further comprising displaying, using a visual display, the virtual approximation of the obstruction zone including the position relative locations of the one or more machine components.

14. The method of claim 10, wherein the one or more components of the machine includes an implement of a machine,
   the implement being capable of being positioned in a plurality of implement positions, and
   wherein determining the component-associated detection data based on the component-associated detection signals is to determine data indicative of the implement being positioned in each of the plurality of implement positions while lying in the obstruction zone.

15. A machine comprising:
   a machine frame;
   one or more machine components attached to the frame;
   one or more ground engaging devices;
   an implement;
   a detection sensor operatively associated with the machine and configured to generate detection signals if the detection sensor senses an object within the zone, and transmit the detection signals;
   an output device configured to provide an alert to an operator of the machine, if an object is present in the zone proximate to the machine, in response to an alert signal; and
   a controller operatively associated with the detection and including a processor and a memory, the controller configured to:
      define an obstruction zone proximate to the machine and within the zone,
      receive the detection signals from the detection sensor,
      determine if the detection signals indicate that an object exists within the obstruction zone,
      determine if the object is indicative of a component, the component being one of the frame, the one or more ground engaging devices, the one or more machine components, the implement, and any combinations thereof, if the detection signals indicate that the object exists within the obstruction zone, based on a learned component detection process, the learned component detection process configured to determine if the object is indicative of the component by comparing the detection signals with component-associated detection data, the component-associated detection data being indicative of occurrences in which one or more of the one or more machine components are detected within the obstruction zone, and
      provide the alert signal to the output device if the object is not indicative of the machine component.

16. The machine of claim 15, wherein the implement is capable of being positioned in a plurality of implement positions, and
   wherein the component-associated detection data includes data indicative of the implement being positioned in each of the plurality of implement positions while lying in the obstruction zone.

17. The machine of claim 15, wherein the controller is further configured to:
   determine the component-associated detection data, and
   store the component-associated detection data on the memory.

18. The machine of claim 17, wherein the controller is further configured to:
   receive the detection signals from the detection sensor over a period of time, during which detectable objects, within the zone, only include the frame, the one or more ground engaging devices, the one or more machine components, the implement, and any combinations thereof, and
   classify the received detection signals over the period of time as component-associated detection signals, and
   wherein, when determining the component-associated detection data, the controller is to determine the component-associated detection data based on the component-associated detection signals.

19. The machine of claim 18, wherein the output device includes a visual display operatively associated with the controller, the visual display configured to display, in response to instructions from the controller, a virtual approximation of the obstruction zone in which space within the approximation of the obstruction zone is populated with position-relative indications of the one or more machine components, lying within the obstruction zone, based on the component-associated detection data.

20. The machine of claim 19, wherein the controller is further configured to populate the virtual approximation of the obstruction zone with the position-relative indications of the one or more machine components, lying within the obstruction zone, based on the component-associated detection data.

* * * * *